Nov. 24, 1936. T. R. GAUTIER ET AL Re. 20,180

STRIP SERVING MECHANISM

Original Filed March 3, 1928 4 Sheets-Sheet 1

Inventors:
Trevor R. Gautier
Harold E. Nichols
by Emery, Booth, Janney & Varney
Attys Nov. 24, 1936. T. R. GAUTIER ET AL Re. 20,180
STRIP SERVING MECHANISM
Original Filed March 3, 1928 4 Sheets-Sheet 2
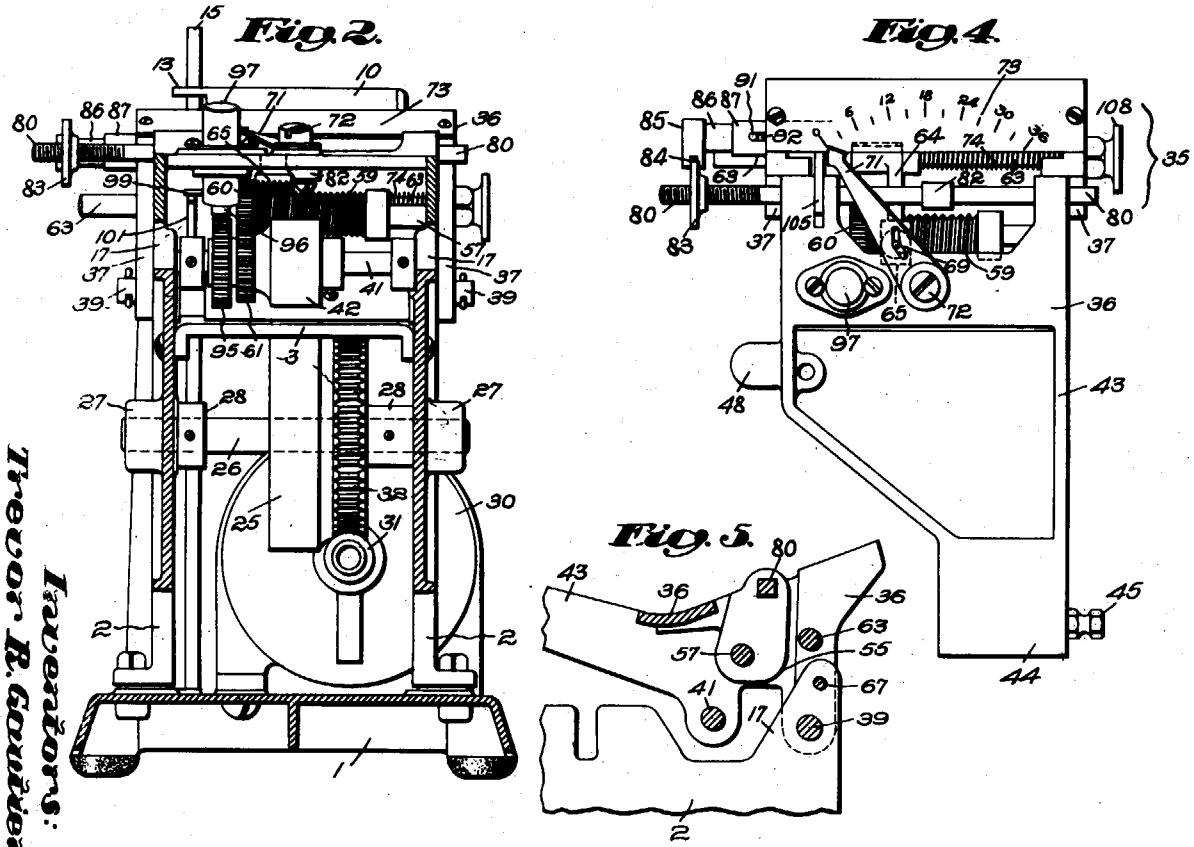
Inventors:
Trevor R. Gautier
Harold E. Nichols
by Emery, Booth, Varney & Vickey
Attys Nov. 24, 1936. T. R. GAUTIER ET AL Re. 20,180
STRIP SERVING MECHANISM
Original Filed March 3, 1928 4 Sheets-Sheet 3
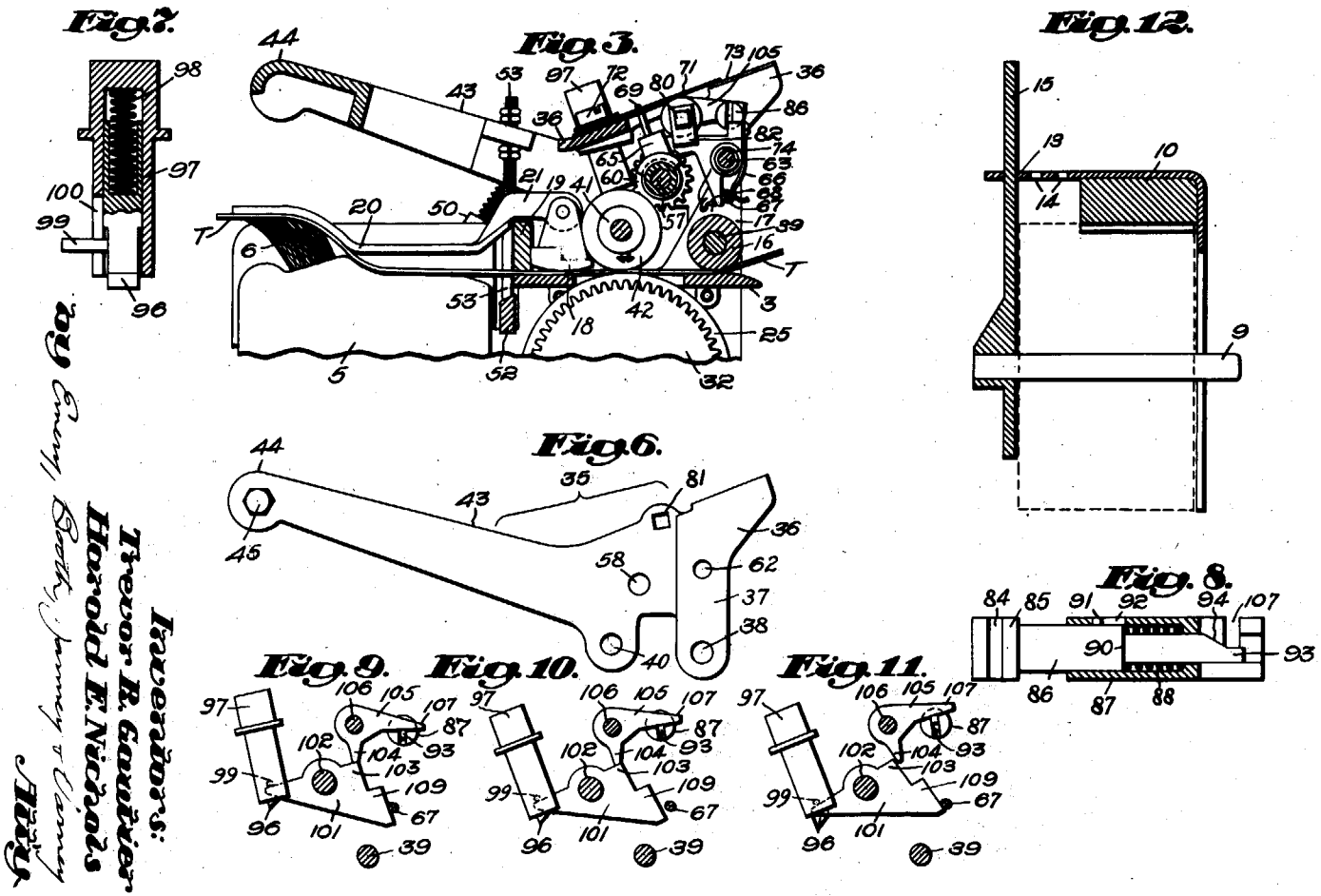
Inventors:
Trevor R. Gautier
Harold E. Nichols
by Emery, Booth, Janney & Varney
Attys.

Nov. 24, 1936. T. R. GAUTIER ET AL Re. 20,180
STRIP SERVING MECHANISM
Original Filed March 3, 1928 4 Sheets-Sheet 4
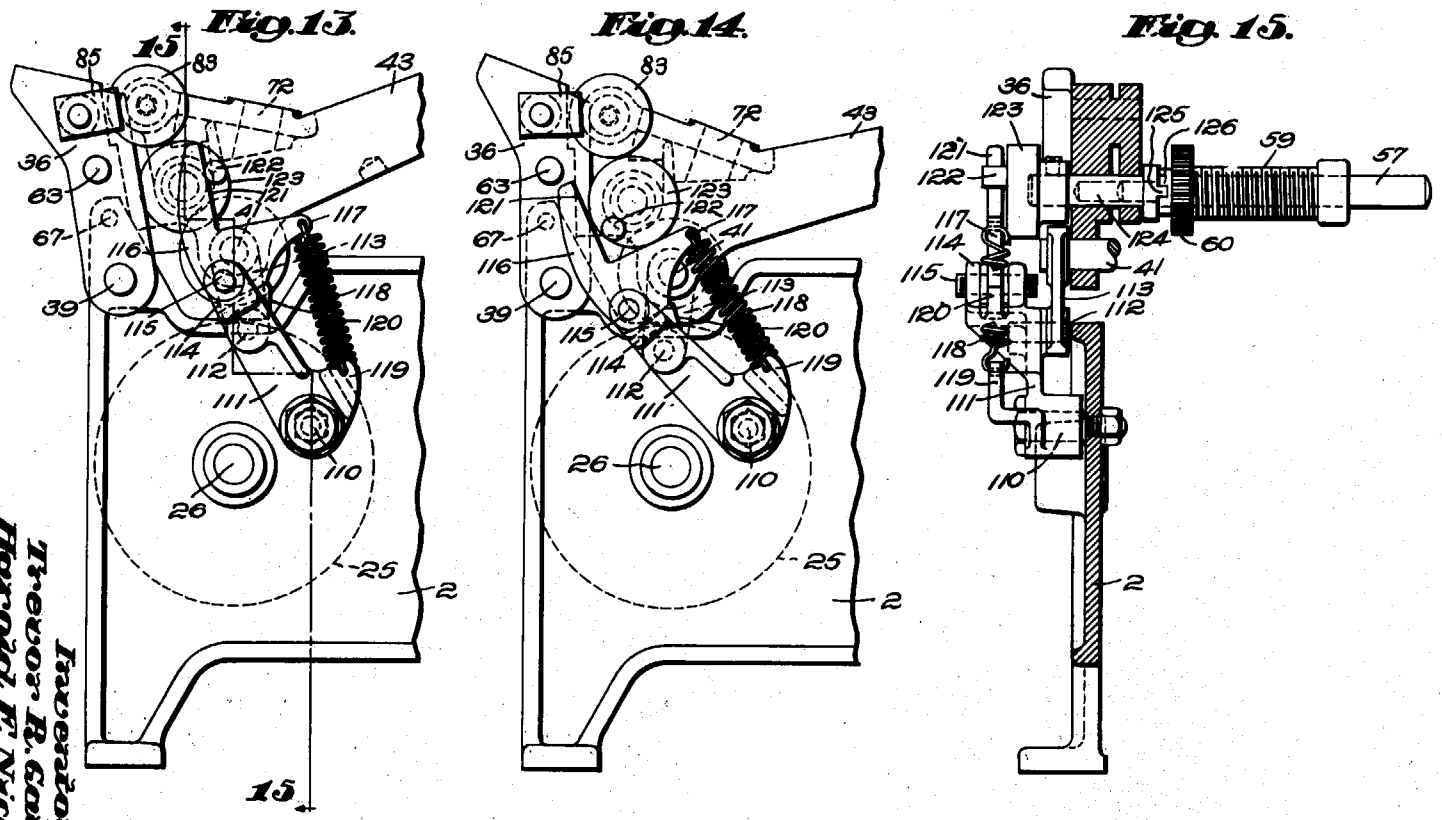
Inventors:
Trevor R. Gautier
Harold F. Nichols
by Emery, Booth, Varney & Varney Attys Reissued Nov. 24, 1936

Re. 20,180

UNITED STATES PATENT OFFICE 20,180

STRIP-SERVING MACHINE

Trevor R. Gautier and Harold E. Nichols, Nashua, N. H., assignors to Nashua Gummed and Coated Paper Company, Nashua, N. H., a corporation of Massachusetts Original No. 1,732,636, dated October 22, 1929, Serial No. 258,875, March 3, 1928. Application for reissue October 11, 1930, Serial No. 488,168

28 Claims. (Cl. 91—14.5)

Our invention relates to mechanism for serving, or serving and moistening, strip material and more particularly aims to provide an improved power-operable, manually-controllable automatic means for delivering and cutting off, or delivering, moistening and cutting off, predeterminable lengths of adhesive or gummed tape or the like, as for package sealing purposes. In certain respects our invention is an improvement upon the mechanism disclosed in the copending application of E. H. Chabot, Serial No. 175,532, filed March 15, 1927, as a division of the latter's application Serial No. 61,901 filed October 12, 1925, and in such or other respects is within the broad scope of certain claims therein.

In the drawings illustrating one form of our invention:—

Fig. 2 is a vertical transverse section on the line 2—2 of Fig. 1, looking in the direction of the arrows;

Fig. 3 is a view similar to the upper left portion of Fig. 1 but showing the parts in operating position.

Fig. 4 is a plan of the control mechanism or head;

Fig. 5 is a partial vertical section of a portion of the control head;

Fig. 6 is a side elevation of the control head frame or casting, prior to assembling;

Figs. 7 and 8 are vertical and horizontal sectional views, respectively, upon a larger scale, illustrating details of the control mechanism;

Figs. 9, 10 and 11 are views, partially diagrammatic, illustrating successive operating positions of a portion of the automatic control mechanism;

Figure 1:
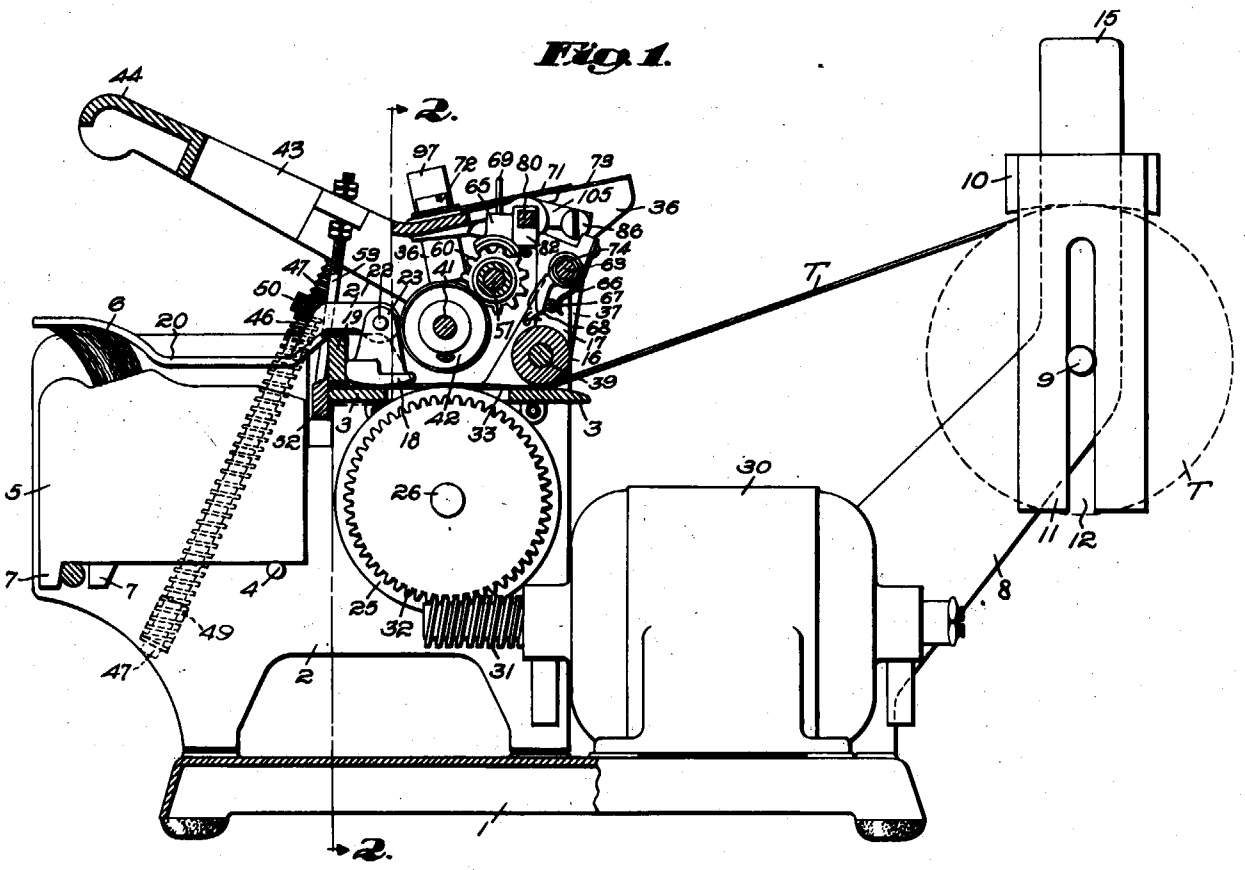
Fig. 1 is a view partially in side elevation and partially in vertical longitudinal section.

Fig. 12 is a vertical cross section through the tape-supply supporting and positioning means; and Figs. 13, 14 and 15 illustrate a modification also in accordance with our invention, Figs. 13 and 14 being partial side elevations, as viewed from the left of the machine, and showing respectively two positions of the parts, and Fig. 15 being a section on the line 15—15 of Fig. 13.

Referring more particularly to the drawings, and first to Figs. 1 to 3, the mechanism as a whole is preferably mounted upon a platform or base 1 upon which are set the spaced side frames 2, 2 interconnected as by the feed floor 3 and by the tie rods 4, 4 near the forward or moistening and delivery end of the machine.

Said tie rods are adapted to serve as supports for the moistening means, illustrated as a reservoir or tank 5 from which projects an inverted brush moistener 6. The moistening means, including reservoir and brush, as shown, is readily bodily removable, being received upon the tie rods and provided with suitably spaced depending bosses 7, 7 for receiving one tie rod 4 between them, to position and retain the reservoir.

The tape supply, usually in roll form, is adapted to be supported at the rear end of the machine, the end opposite the moistening and delivery end. For this purpose we have provided the rearwardly and upwardly-extending tape bracket 8 preferably secured to the base 1, or it may be positioned independently thereof. This bracket carries a lateral stud 9 (see also Fig. 12) adapted to support rotatably a roll of gummed paper or other tape or strip material T to be dispensed, the stud 9 being positioned at a proper height to support for free movement the largest diameter roll which it is desired to use.

In connection with said bracket and stud we have provided novel means for retaining the tape roll in feeding position and at the same time controlling the tension on the tape and preventing back lash. As illustrated, said means comprises a single element including a weighted member 10 which may have its under face properly concaved to conform generally to the periphery of the tape roll upon which it rests. Integral with or secured to the weight 10 is a depending arm or fork 11 formed with a vertical slot 12 open at its bottom to permit said member to be passed downwardly over the stud 9. Projecting laterally from the weight is a plate or extension 13 having series of slots or openings 14 whereby the plate may be passed downwardly over the upper portion or finger 15 of the tape bracket 8. If desired, and as illustrated, the transverse member or plate 13 and the depending member or fork 11 may be formed of a single strip bent at right angles and attached to the weight. By reason of the plurality of the openings 14, the described positioning and regulating element is adapted to cooperate with tape rolls of various widths. Claims directed to this strip regulating and positioning means are contained in the copending divisional application of T. R. Gautier, Serial No. 363,083, filed May 14, 1929.

The tape T coming from the supply or roll is advanced to the feed floor 3, passing first beneath a guide roll 16 rotatably supported between the side frames or the upward extensions thereof or stands 17, 17, and is adapted to be fed forwardly across the feed floor by mechanism to be described. Near the forward portion of the feed floor and just to the rear of the severing means the tape passes beneath a removable weighted member 18, preferably having a somewhat convex lower face, and which may be similar to the member disclosed and claimed in the patent to T. R. Gautier, No. 1,568,506, dated January 5, 1926. The tape then passes beneath the fixed blade 19 carried by the side frames and constituting a portion of the tape severing means, and thence is guided forwardly across the reservoir and over the brush moistener to the delivery point.

The tape is guided in proper moistening relation to the brush as by means of the plate or presser 20 resting freely upon the tape as it passes over the brush. Said plate or presser 20 is arranged for vertical pivotal or yielding movement and, as illustrated, is readily bodily removable from the machine together with the weighted member 18. For this purpose the plate is formed with a rearward extension 21 received between and pivotally connected, as at 22, to upright lugs 23, 23, upon the member 18 (see particularly Figs. 1 and 3). The forward face of the weighted member 18, when the latter is in assembled position, rests, or is forced by the feed, against the rear face of the fixed blade 19, and the rearward extension 21 of the plate overlies said blade. Both the plate 20 and the member 18 are thus retained in proper position, while enabling them both to be removed together by merely grasping and lifting either of them. Claims for a strip guiding means, including, among other features, a plate and associated depresser as above described are contained in our co-pending application, Serial No. 385,533, filed August 13, 1929. Claims for moistening means and associated parts as herein described or adapted for use in connection with the present invention are contained in the co-pending applications of T. R. Gautier, Serial No. 754,125, filed December 5, 1924, Patent No. 1,732,638; Serial No. 39,275, filed June 24, 1925, Patent No. 1,732,639; and Serial No. 135,062, filed September 13, 1926, Patent No. 1,732,637.

For feeding the tape there is provided a feed wheel or roll 25 which, as illustrated, need not be of the full width of the tape. This feed roll 25 (see particularly Fig. 2) is fast on a cross shaft 26 journalled at its opposite ends in bearings 27, 27 on the respective side frames and held against longitudinal shifting movement as by the collars 28, 28. Said feed roll may be actuated in any suitable manner, as by a pulley on the shaft 26, but is preferably arranged for direct motor drive from an electric motor 30, herein mounted upon the platform 1, but which may be otherwise supported. Fixed on the shaft 26, herein between the side frames 2, 2, is a worm gear 32 meshing with a worm 31 formed on or directly connected with the rotor of the motor 30. The feed floor 3 is formed with an opening 33 (see Figs. 1 and 3) into which the feed roll 25 projects to engage with its periphery the under face of the tape.

The remaining portion of the feed mechanism which cooperates with the driven feed roll 25 to feed the tape, and also the entire feed control mechanism, in accordance with the present form of the invention, is mounted on or carried by a control head or frame. As best seen in Fig. 6, said head comprises a main frame or carrier 35 preferably formed as an integral element or casting. Said frame together with the parts carried by it will hereinafter be referred to as the control head. As best seen in Figs. 1, 4 and 6, this frame or carrier 35 comprises a main or carrier portion 36 of substantially the width of the machine and provided near its rear part with downwardly extending lugs or ears 37 formed with bearings 38, 38 for pivotally supporting the entire control head, as upon the stud shaft 39 (see Figs. 1, 3 and 5) extending between the stands 17, 17 on the side frames. The guide roll 16 previously mentioned is also mounted on said stud shaft 39.

Forwardly of the point of pivotal support of the control head the carrier frame 35 is provided at its opposite sides with bearings 40 for rotatably supporting a cross shaft 41 to which is fixed the upper feed roll 42, in position to cooperate with the lower and driven feed roll 25 so as to feed the tape between them when the upper feed roll engages the upper face of the tape and is free to rotate. The control head includes a forwardly extending operating lever 43 which may be of the general form seen in Fig. 4, having a finger piece 44 at its forward end. Said lever 43 may be provided with means such as the button 45 for connection with a pedal or other foot control means.

The operating lever 43 and entire control head is normally maintained in raised position, substantially as shown in Fig. 1, as by means of a sufficiently strong spring 46 through which extends a guide rod 47 secured at its upper end to the projection 48 on the operating lever or other portion of the control head and slidably guided at its lower end in a boss 49 on the adjacent side frame 2. This spring bears at its lower end against the upper face of said boss and at its upper end against a thumb screw or adjustable collar 50 threaded upon the guide rod 47. From the foregoing it will be understood that when the control head is depressed by downward pressure on the lever 43, compressing the spring 46, the upper feed roll 42 is brought down into position to engage and feed the tape in cooperation with the lower and driven feed roll 25. The upper feed roll is rotated only by reason of its co-action with the lower and driven feed roll, through the tape engaged between them. The tape is accordingly fed so long as the two feed rolls remain in tape engaging position and the upper feed roll is left free to rotate.

Upon release of the depressed operating lever, the control head is returned to its inoperative or raised position and the tape is severed, as by means of the pivoted blade 52 supported at one end upon one of the side frames and cooperating in a shearing manner with the fixed blade 19 previously mentioned. The pivoted blade is operatively connected at its free end with the operating lever as by means of the adjustable rod 53, sufficient movement of said rod relative both to the operating lever and to the pivoted blade being afforded in its connections therewith to permit it to conform to the slightly arcuate movement of the operating lever. The pivoted blade is disposed normally to lie below the path of the tape and to return to such position immediately upon completion of the severing operation, a lost-motion or similar connection between the blade and the rod 53 being provided such as to permit the blade to drop back to a normal position clear of the path of the tape, although the operating lever remains fully elevated. This clearing action of the blade may be assisted by a suitable spring if desired. The operating member and control head are limited in their upward movement by suitable means such as that seen in Fig. 5, the carrier or casting 35 being formed at one or both sides with a boss or a stop 55 to contact with the forward face of the stand 17 on the corresponding side frame.

The construction and arrangement of the control head, as herein illustrated, is such that the same frame or casting is adapted for use with several different control mechanisms, to adapt the machine for control in a like number of different ways, according to the conditions under which it is to be utilized. For example, in many instances it is merely desirable that the machine shall feed and moisten tape under power operation, the operating period and consequent length of tape fed to be determined by the length of time the operating lever is held depressed. In such case, with the described mechanism, the operator depresses the lever and control head, the tape is fed out and moistened, and the operator releases the lever, effecting stoppage of feed and causing tape severance, when he judges that the desired length has been delivered. For accomplishing this result the machine need include only the mechanism described to this point, the control head carrying, in addition to its spring and its blade-operating connections, only the cross shaft 26 and upper feed roll 42 thereon. The machine so equipped may be referred to as type "A".

In other instances it is desirable that the operator be able to determine accurately at any instant the length of tape which has been fed, rather than leaving this determination to his judgment and operating skill as in type "A". To afford such measured operation under manual control, in accordance with the invention the control head is supplied in addition with suitable measuring or indicating mechanism and when so equipped may be referred to as type "B".

Referring to Figs. 1 to 6, and more particularly to Figs. 2, 3, and 4, the control head is provided in type "B" with an additional cross shaft 57 journalled at its opposite ends in the sides of the control head, preferably somewhat above the axis of the upper feed roll 42, as in the bearings indicated at 58 in Fig. 6. Fixed on said shaft 57 is a worm or spiral 59 and also a pinion 60 meshing with a similar pinion 61 fixed on the shaft 41 of the upper feed roll 42. The spiral or worm is thus rotated by and proportionately to the upper feed roll 42, and consequently in proportion to the length of tape fed.

To the rear of the shaft 57 the control head frame or carrier 35 is drilled, as at 62, Fig. 6, to receive the rod 63 upon which is rockably and slidably supported a finger 64 (see particularly Figs. 1, 3 and 4) having depending from its forward end a partial nut 65 adapted to mesh with the worm 59 at certain times. Said slidable and rockable finger 64 has fixed to its rear portion a leaf spring 66 the lower portion of which engages a stationary rod 67 extending between the stands 17, 17 on the machine side frames. This spring tends to urge the nut 65 downwardly and toward the spiral 59.

When the control head is in raised or normal and inoperative position, as in Fig. 1, the finger 64 and partial nut 65 carried thereby are raised away from the spiral so that said nut is out of engagement therewith. This is herein effected by reason of a downwardly projecting nose 68 on the finger 64, the rear face of which nose is engageable in a camming manner with the stationary rod 67, but at the side thereof opposite that contacted by the spring 66. It will be understood that as the control head is depressed all parts thereon, including the finger 64 move bodily about the control head pivot 39. The pivot 63 of the finger 64 is thus moved counterclockwise or to the left in Figs. 1 and 3, tending to carry the nose 68 away from the stationary rod 67, sufficiently to permit the spring 66 to rock the finger and partial nut 65 down into engagement with the spiral as shown in Fig. 3. A reverse operation takes place when the depressed control head is released and lifted by its return spring 46, the nose 68 being cammed upwardly by the stationary rod 67 and thus lifting the nut away from the spiral and back into the normal or inoperative position of Fig. 1.

In this manner the nut, normally out of engagement with the spiral, is brought into operative engagement with it for actuation thereby simultaneously with the bringing of the upper feed roll into tape feeding relation with the driven feed roll 25. Rotation of the spiral will thus cause the nut to be traversed, its supporting finger 64 sliding along the rod 63.

Projecting upwardly from the traversable nut 65 is a pin 69 received in an arcuate slot 70 formed in an indicator or pointer 71 swivelled on the upper face of the control head, as at 72, and cooperating with a scale or index 73 marked in inches or other suitable units to indicate the length of tape fed. By watching the indicator 71, which is moved proportionately to the length of tape fed by the mechanism above described, the operator may tell at any time the length which has been delivered and moistened. When the indicator shows that the desired length has been reached, the operator releases the lever, whereupon the control head is returned to the position of Fig. 1, the tape feed is interrupted by movement of the upper feed roll away from the driven feed roll 25, and the served portion of tape is severed. With the return of the control head to raised position the traversable half-nut 65 is also lifted out of engagement with the spiral to permit it to shift back transversely of the machine to its initial or zero position. Such return of the nut 65 is effected as by means of the coil spring 74 which encircles the rod 63 on which the nut is carried and bears at its opposite ends against the finger 64 and the side of the control head, forcing the finger back against a stop or collar on said rod. It will thus be seen that the control head is constructed and arranged for actuation under manual control either with or without a positive indicating mechanism to show or visually measure the length fed, in accordance with the arrangement of type "B" or "A" respectively.

Under still other conditions it is desirable that an adjustable but accurately predeterminable length of tape may be served, the feed to be terminated automatically at the desired length. For this purpose the machine may additionally be equipped with novel feed-stop mechanism, for the reception of which the control head is particularly adapted, in accordance with the present invention. This latter equipment may be referred to as type "C".

Referring still to Figs. 1 to 6 and first more particularly to Figs. 4 and 6, the control head is provided with an additional bar 80 slidably but non-rotatably received in openings at the opposite sides of the control head, one of which is seen at 81 in Fig. 6, illustrated as a square opening to cooperate with a like formed section of said slidable bar to prevent rotation thereof. The slidable bar carries a stop 82, see also Figs. 1, 2 and 3, in position to be engaged by the nut-carrying finger 64 and is threaded at one end, herein the left as seen in Figs. 2 and 4, to receive an adjustable thumb-nut 83. The flange of this adjustable nut projects into a groove 84 formed in the head 85 of a plunger 86, seen in detail in Fig. 8. Said plunger is slidable in a housing 87, being normally urged outwardly as by a coil spring 88 surrounding a portion of the plunger of reduced diameter and bearing intermediate the shoulder 90 on the plunger and the inner end of the housing. Outward movement of the plunger is limited as by means of a stop 91 thereon working in a slot 92 in the plunger housing. At its inner end the plunger is formed with a nose 93 and an inclined cam portion 94.

Said plunger cooperates with feed-stop mechanism preferably carried by the control head and which may be best described with reference to the Figs. 9 to 11 but which is also seen in Figs. 1 to 4. Upon the cross shaft 41 and coaxial with the upper feed roll 42 is fixed a ratchet wheel 95; see particularly Figs. 2 and 4. Above said ratchet wheel is a spring-pressed detent or dog 96, seen in detail in Fig. 7, and which is guided for sliding movement toward and away from the ratchet wheel in a housing 97 removably mounted on the control head. The detent is urged downwardly or outwardly of the housing as by the coil spring 98 bearing intermediate the detent and the upper wall of the housing. Projecting laterally from the detent and toward the left as viewed in Figs. 2 and 7 is a pin 99 extending through a slot 100 in the housing and whereby the detent may be held up against its spring pressure or be permitted to drop.

Said pin 99, as best seen in said Figs. 9 to 11, rests upon one end of a rockable latch 101 pivotally supported as at 102 upon the adjacent wall of the control head. At the opposite side of its pivot point this latch is formed with a shoulder 103 adapted to be engaged by a nib 104 of a trigger 105 pivoted at 106 upon the same wall of the control head. Said trigger has a rearwardly projecting finger 107 which rests upon the nose 93 of the spring-pressed plunger 86 previously described.

The normal position of the parts just mentioned is that shown in Fig. 9, which they occupy during non-feeding of the machine, and also during feeding, up to the point at which the feed is to be terminated. Referring to said Fig. 9, it will be understood that if the trigger finger 107 is lifted the nib 104 will be caused to slide off from the shoulder 103 into the position shown in Fig. 11, in so doing first lifting the pin 99 slightly and still further compressing its spring 98, and then permitting said spring to depress the detent 96 into engagement with the ratchet wheel 95. The detent and ratchet wheel are so arranged that immediately upon their inter-engagement they hold the upper feed roll 42 from tape feeding movement, that is, as herein illustrated, from movement in a clockwise direction as viewed in Figs. 1 and 3. The lower or driven feed roll 25 at such time may continue its rotation but merely slips past the adjacent face of the tape without feeding it, due to the stationary position of the upper feed roll. Thus the motor may run continuously.

Said automatic feed-stop mechanism may be set to afford any desired length of tape by simply adjusting the position of the stop 82. This may readily be done by moving the pointer to the desired length-indication on the scale and then adjusting the stop 82, by sliding its bar 80 through the medium of the thumb nut 83, so that the nut-carrying finger 64 will just come up into engagement with the stop 82 when the pointer is over said indication. To facilitate this adjustment the rod 63 upon which the nut carrying finger 64 is mounted may be made slidable in the control head and be provided at one end, the right as viewed in Figs. 2 and 4, with a head 108 which may be grasped to draw the rod outwardly, thus shifting the finger 64, the nut 65 and the pointer 71 to the desired position.

Having set the feed-stop mechanism, the operator may start the feeding operation in the usual manner, by depressing the operating lever and the control head to which it is attached, bringing the upper feed roll down into tape feeding relation with the lower feed roll, and also effecting engagement of the traversable nut with its operating spiral or worm. The operator thereafter need not consult the feed-length indicating mechanism to ascertain when the predetermined length of tape has been delivered, as the feed will be stopped automatically at the proper point. As the traversable-nut-carrying finger 64 comes up against the stop 82 it shifts the latter and the bar 80 to the right as viewed in Fig. 4. Through the connecting thumb nut 83 on said bar the plunger 86 is thus caused to move inwardly against its spring, engaging the plunger cam 94 beneath the finger 107 of the trigger 105, thus tripping the latter and permitting the detent 96 to be forced down into engagement with the ratchet wheel 95 thereby to stop the feed in the manner already described.

Means is also provided whereby the automatic feed-stop mechanism, and particularly the detent 96 and associated parts, are returned to their normal position after having acted to stop the feeding and upon subsequent release of the operating lever for return to its normal or raised position. Referring first to Fig. 9, it will be understood that since the plunger 86, the trigger 105, the latch 101, and the detent 96 are all carried by the control head, they all move with the latter when it is depressed, the pivot points 102 and 106 of the latch and trigger travelling in a short arc about the stud shaft 39, which is the pivot point for the entire control head. The latch 101, in addition to its parts already mentioned, is provided with a rearwardly extending nose 109 having a rear face normally in engagement with the stationary rod 67 extending between the machine side frames, this engagement resulting from downward pressure of the spring 98 in the detent housing, which, through contact of the pin 99 with the latch 101, tends to pivot said latch in a manner to move the nose 109 thereof toward the stationary rod 67. As illustrated in Fig. 9 the control head and operating lever are in their inoperative or raised position.

In Fig. 10 the same parts are shown in the depressed or operating position of the control head but with the detent still in raised position, permitting the tape to feed. In said Fig. 10 it will be noted that the several parts have revolved about the point 39 in a counter clockwise direction so that the nose 109 of the latch 101 is carried out of engagement with the stationary rod 67. The detent spring cannot move this latch nose further to the right in the figure and back into engagement with said stationary rod 67 so long as the nib 104 of the trigger 105 rests upon the latch shoulder 103.

Assume now that the desired tape length has been fed and this trigger has been tripped, by actuation of the stop 82 and plunger 86, to stop the feed. The trigger nib 104 rides off the latch and the detent 96 is permitted to be forced down by its spring. As the detent comes down the latch is rocked slightly upon its pivot in a clockwise direction, bringing its nose 109 again into engagement with the stationary rod 67. This condition of the parts is that illustrated in Fig. 11, wherein the control head and operating lever are still depressed. Upon release of the operating lever, the control head and the parts illustrated in Fig. 11, with the single exception of the stationary rod 67, return bodily in an arcuate path about the center 39 and in a clockwise direction, into their former position, as shown in Fig. 9. This bodily movement of the parts upwardly and toward the right in Fig. 11, including the latch 101, forces the nose 109 of the latter still more strongly against the stationary bar 67. Since the control head return-spring 46 is much stronger than the detent spring 98, the latch 101, through said engagement of its nose with the stationary rod 67 is caused to rock on its pivot in a clockwise direction, lifting its forward portion upon which the detent pin 99 rests and thereby withdrawing the detent from the ratchet wheel and returning it to its raised position. If desired, a small spring (not necessary to be shown) may be provided to assist in the return rocking movement of the trigger 105 on its axis 106, promptly to bring it from its position as in Fig. 11 to its original position as in Fig. 9.

All of the parts are thus brought back again to their normal position in preparation for the feeding of succeeding lengths of tape under automatic control.

In Figs. 13 to 15 we have illustrated a modified form of mechanism also embodying our invention. In said figures parts not otherwise referred to will preferably be the same as in figures previously described. The mechanism of said Figs. 13 to 15 exemplifies one means whereby the rotary spiral or worm 59 or other rotary or measuring device with which the index or pointer cooperates is caused to return always to its same or original angular position, its starting position, after each actuation.

For this purpose we have provided a stud 110 upon one side frame 2, herein the left side, this stud serving as a hinge pin for an arm 111. Near its upper end said arm 111 carries a lateral pin 112 on which is journalled one end of a link 113, the other end of which is journalled upon the adjacent projecting end of the upper feed roll shaft 41. The arm 111 is operatively connected with the control head operating lever 43.

Said arm 111 is also provided at its upper end with a lateral, offset forked portion 114, (see particularly Fig. 15) across which extends a clevis pin 115, the latter serving as a pivotal support for a worm returning element or bumper arm 116. The arm 116 is formed with a second arm portion or finger 117 to the end of which is secured a helical spring 118 having its opposite end attached to a short projecting portion 119, formed integrally with the arm 111. In the inactive or normal position of said parts, the spring 118 holds the bumper arm 116 upwardly and against a burnished spot or stop 120 on the arm 111. At such time the operating handle 43 is raised as in Fig. 13, and the forward face 121 of the bumper arm 116 is in contact with a crank pin 122 projecting laterally and outwardly from a disk 123 attached to the outer end of a sleeve 124 journalled in the adjacent portion of the control head frame. At its inner end the sleeve 124 is formed with a diametral tongue 125 seating in a corresponding slot 126 in the adjacent end of the spiral or worm 59, thus connecting the latter, the sleeve 124, the disk 123 and the crank pin 122 for rotation in unison.

The operation of the described parts will be readily understood and particularly by reference to Fig. 14, which illustrates the parts in a position such as occupied during feeding operation of the machine. When the control head is depressed to institute a feeding operation the link 113, being pivoted on its control head at its upper end, is moved down, forcing the arm 111 to be rocked counter-clockwise as viewed in Figs. 13 and 14, further tensioning the spring 118 and at the same time carrying the bumper arm 116 as a whole rearwardly and downwardly out of the path of the crank pin 122, substantially into the position indicated in Fig. 114. This crank pin, disk 123 and the measuring spiral 59 are thus free to rotate. When pressure on the operating handle is released to stop the feed, the arm 111 is snapped back into its original position, by reason of its connection with the operating handle. This also brings the forward face 121 of the bumper arm 116 into engagement with the crank pin 122, in whatever position circumferentially of the axis of the disk 123 of the spiral 59 it may have been left. Engagement of the bumper arm with said crank pin, further assisted by the action of the tensioned spring 118, will move the crank pin in one or the other rotary direction, dependently upon the position in which it is first engaged, back into its original or starting position as shown in Fig. 13, that being the farthest point forward or to the right, in the figures, to which the crank pin may be moved. The crank pin is so arranged with respect to the spiral that when the former is in its indicated starting position the spiral will be in its desired starting position, so that the engaging portion of the movable pointer will immediately cooperate with the thread of the spiral, eliminating all possible lost-motion or inaccuracy in measuring.

Our invention is not limited to the particular embodiments thereof herein shown and described, its scope being set forth in the appended claims.

We claim:

1. In a strip serving machine for labeling, package sealing and the like, a support for a strip supply, roll means for feeding the strip, a motor to drive said feeding means, direct gearing connections between the motor and feeding means, including a worm on the rotor element of the motor meshing with a worm wheel coaxial with a roll of the feeding means, and manually controllable means to render the feeding means operative or inoperative during continuing operation of the motor.

2. In mechanism for serving strips of tape or the like, a support for a tape supply, rotary feeding means comprising a pair of rolls adapted to engage and feed tape between them, a motor and driving connections with one of said rolls, manual means whereby the motor may be continued in operation and the feeding action of said rolls may be intermittently effected or stopped at the will of the operator, other means whereby a feeding action, manually instituted, may be automatically terminated at a predetermined and variable interval without interrupting operation of the motor, and tape severing means connected with said manual means for operative control thereby.

3. In mechanism for serving strips of tape or the like, a support for a tape supply, a plurality of separable rolls for feeding the tape from said supply, means to rotate one of said rolls, tape measuring means actuated by one of said rolls to measure and indicate the length fed, and automatic, adjustable means associated with said measuring means to stop the feed at predetermined lengths during continuing operation of said roll rotating means.

4. In mechanism for serving strips of tape or the like, a support for a tape supply, a plurality of rolls for feeding the tape from said supply, means to rotate said rolls, an index element, a support whereon said element is movable, a spiral formation rotatable proportionately with and by one of said rolls, connections between said formation and element whereby rotation of the roll produces a proportionate travel of said index element, and automatic, adjustable means associated with said measuring means to stop the feed at predetermined lengths.

5. In mechanism for serving strips of tape or the like, a support for a tape supply, a plurality of rolls for feeding the tape from said supply, means to rotate said rolls, an index element movable lengthwise the rolls, connections between one of said rolls and said index element to move the same in proportion to the length of tape fed, means to return said element to its initial position upon completion of the feeding operation, and automatic, adjustable means associated with said measuring means to stop the feed at predetermined lengths.

6. In a strip serving machine, a support for a strip supply, feed rolls, means to drive the same, a lever to control said driving means, a movable index element to measure and indicate the length of strip fed, means whereby movement of said control lever effects operative engagement between said index element and a driven part, and automatic adjustable means associated with said measuring means to stop the feed at predetermined lengths.

7. In a strip serving machine, a support for a strip supply, a pair of feed rolls, a motor to drive one of said rolls, the other roll being movable into and out of feeding relation with the driven roll, a control lever to shift said movable roll, an index element movable to measure and indicate the length of the strip fed, a spiral arranged to be rotated with and proportionately to the feeding rotation of said rolls, means connected to the index element and adapted to engage the spiral to cause the measuring and indicating movement of said index element, said control lever being arranged to effect said engagement when moved to bring the rolls into feeding relation, and automatic, adjustable means associated with said measuring means to stop the feed at predetermined lengths.

8. In mechanism for serving strips of tape or the like, a support for a tape supply, a plurality of separable rolls for feeding the tape from said supply, means to rotate one of said rolls, indicating means movable proportionately to the length of tape fed, means to actuate the same, and automatic, adjustable means associated with said indicating means to stop the feed at predetermined lengths during continuing operation of said roll rotating means.

9. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape-feeding relation with said driven feed roll in the "on" position of said head, then engaging the opposite face of the tape, and tape measuring means on said carrier portion of the control head including an index and movable indicating member for cooperation therewith.

10. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape-feeding relation with said driven feed roll in the "on" position of said head, then engaging the opposite face of the tape, said carrier portion of the control head being also provided with an index graduated in units of tape length, a movable indicating member to cooperate therewith, and operating connections for the latter whereby said indicating member is moved proportionately to the length of tape fed.

11. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape-feeding relation with said driven feed roll in the "on" position of said head, then engaging the opposite face of the tape, said carrier portion of the control head being also provided with an index graduated in units of tape length, a movable indicating member to cooperate therewith, an operating member therefor, a spiral wherewith the latter is engageable, and means whereby said spiral is rotated proportionately to the length of tape feed.

12. In mechanism for serving strips of tape or the like, a frame, a tape supply support, a feed roll engageable with one face of the tape from said supply, a motor and drive connections with said feed roll, a control head pivoted on said frame for movement into and out of operating position, a spring and stop means normally maintaining said control head in non-operating or "off" position, a second feed roll, on said head, arranged to have tape-feeding relation with said driven feed roll in the "on" position of said head, then engaging the opposite face of the tape, said control head being also provided with an index graduated in units of tape length, a movable indicating member to cooperate therewith, an operating member therefor, a spiral wherewith the latter is engageable, and means whereby said spiral is rotated proportionately to the length of tape fed, said operating member being engaged with and disengaged from said spiral in the "on" and "off" position of the control head respectively.

13. In mechanism for serving strips of tape or the like, a frame, a tape supply support, a feed roll engageable with one face of the tape from said supply, a motor and drive connections with said feed roll, a control head pivoted on said frame for movement into and out of operating position, a spring and stop means normally maintaining said control head in non-operating or "off" position, a second feed roll, on said head, arranged to have tape-feeding relation with said driven feed roll in the "on" position of said head, then engaging the opposite face of the tape, said control head being also provided with an index graduated in units of tape length, a movable indicating member to cooperate therewith, an operating member therefor, a rotary cylindrical member having a spiral formation wherewith said operating member is engageable, and gearing connections between said second feed roll and said cylindrical member.

14. In mechanism for serving strips of tape or the like, a frame, a tape supply support, a feed roll engageable with one face of the tape from said supply, a motor and drive connections with said feed roll, a second feed roll bodily movable to and from feeding relation with said first feed roll, a ratchet-wheel mounted for rotation with said second and bodily movable feed roll, a dog engageable with said ratchet-wheel to hold the same and said feed roll from rotation thereby to interrupt the tape feed, and means to effect engagement of said dog and ratchet when a predetermined length of tape has been fed.

15. In mechanism for serving strips of tape or the like, a frame, a tape supply support, a feed roll engageable with one face of the tape from said supply, a motor and drive connections with said feed roll, a control head pivoted on said frame for movement into and out of operating position, a spring and stop means normally maintaining said control head in non-operating or "off" position, a second feed roll, on said head, arranged to have tape-feeding relation with said driven feed roll in the "on" position of said head, then engaging the opposite face of the tape, said control head also provided with a ratchet-wheel mounted for rotation with said second feed roll, a dog engageable with said ratchet-wheel to hold the same and said feed roll from rotation thereby to interrupt the tape feed, and means to effect engagement of said dog and ratchet when a predetermined length of tape has been fed.

16. In mechanism for serving strips of tape or the like, a frame, a tape supply support, a feed roll engageable with one face of the tape from said supply, a motor and drive connections with said feed roll, a control head pivoted on said frame for movement into and out of operating position, a spring and stop means normally maintaining said control head in non-operating or "off" position, a second feed roll, on said head, arranged to have tape-feeding relation with said driven feed roll in the "on" position of said head, then engaging the opposite face of the tape, said control head being also provided with an index graduated in units of tape length, a movable indicating member to cooperate therewith, an operating member therefor, a spiral wherewith the latter is engageable, means whereby said spiral is rotated proportionately to the length of tape fed, a ratchet-wheel operatively connected with said second feed roll, a dog engageable with said ratchet-wheel to hold the latter and said second feed roll from rotation, but normally disengaged from said ratchet-wheel, and connections between said dog and said indicator-operating member whereby said dog is caused to engage said ratchet-wheel thereby to stop the tape feed when a predetermined length has been fed.

17. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape feeding relation with said driven roll in the "on" position of said head, then engaging the opposite face of the tape, whereby tape will be fed in response to movement of said control head by the operator to "on" position and of a length determined by the period during which he retains said control head in "on" position, said carrier portion of the control head being constructed and arranged for the addition thereto of positive tape measuring means to indicate the length of tape fed at any instant.

18. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape feeding relation with said driven roll in the "on" position of said head, then engaging the opposite face of the tape, whereby tape will be fed in response to movement of said control head by the operator to "on" position and of a length determined by the period during which he retains said control head in "on" position, said carrier portion of the control head being constructed and arranged for the addition thereto of automatic stop means to terminate the tape feed when a predetermined length thereof has been fed.

19. In mechanism for serving strips of tape or the like, a frame, a tape supply support, a feed roll engageable with one face of the tape from said supply, a motor and drive connections with said feed roll, a control head pivoted on said frame for movement into and out of operating position and comprising a main or carrier portion and a member for pivotally moving said main or carrier portion, a spring and stop means normally maintaining said control head in non-operating or "off" position, a second feed roll, on said head, arranged to have tape feeding relation with said driven roll in the "on" position of said head, then engaging the opposite face of the tape, whereby tape will be fed in response to movement of said control head by the operator to "on" position and of a length determined by the period during which he retains said control head in "on" position, said carrier portion of the control head being constructed and arranged for the addition thereto of positive tape measuring means to indicate the length of tape fed at any instant and also for the addition thereto of automatic stop means to terminate the tape feed when a predetermined length thereof has been fed.

20. In a strip serving machine, a support for a strip supply, a pair of feed rolls, a motor to drive one of said rolls, the other roll being movable into and out of feeding relation with the driven roll, a control lever to shift said movable roll, an index element movable to measure and indicate the length of the strip fed, a spiral arranged to be rotated with and proportionately to the feeding rotation of said rolls, means connected to said index element and adapted to engage said spiral to cause the measuring and indicating movement of said index element, said control lever being arranged to effect said engagement when moved to bring said rolls into feeding relation, and means to return said spiral to its original or starting angular position after each feeding operation.

21. In a strip serving machine, a rotary spiral, means for rotating the latter proportionately to the length of strip served, and means to return said spiral to its original angular position after each strip serving operation.

22. In a strip serving machine, a rotary spiral, means for rotating the latter proportionately to the length of strip served, an indicating element having connected to it a part engageable with said spiral for actuation thereby, means to effect engagement of said part and said spiral at the start of a serving operation and disengagement at the end thereof, and means to return said spiral to its original or starting angular position after each strip serving operation.

23. In a mechanism for serving strips of tape or the like, a support for a tape supply, a plurality of rolls for feeding the tape from said supply, means to rotate said rolls, a movable index element, actuating means therefor operatively connected to said roll-rotating means to move said index element proportionately to the length of tape fed, and means to return said index element and its actuating means to their respective original or starting positions after each tape feeding operation.

24. In mechanism for serving strips of tape or the like, a frame, a tape supply support, a feed roll engageable with one face of the tape from said supply, a motor and drive connections with said feed roll, a control head pivoted on said frame for movement into and out of operating position, a spring and stop means normally maintaining said control head in non-operating or "off" position, a second feed roll, on said head, arranged to have tape-feeding relation with said driven feed roll in the "on" position of said head, then engaging the opposite face of the tape, said control head being also provided with an index graduated in units of tape length, a movable indicating member to cooperate therewith, an operating member therefor, a spiral wherewith the latter is engageable, means whereby said spiral is rotated proportionately to the length of tape fed, said operating member being engaged with and disengaged from said spiral in the "on" and "off" position of the control head respectively, means to return said indicating member to zero or starting position, and means to return said spiral to its original or starting angular position prior to reengagement of said index-operating member therewith.

25. In mechanism for serving strips of adhesive tape or the like, a support for a tape supply, a plurality of rolls for feeding the tape from said supply, means to rotate said rolls, a movable index element, actuating means to move said index element proportionately to the length of tape fed, and automatic, adjustable mechanism operatively associated with one of said means to stop the feed at predetermined lengths during continuing operation of said roll rotating means.

26. In a strip serving machine of the type described, a supply of gummed strip, a moistening means, strip severing means, a continuously movable strip feeding means normally out of positive engagement with the strip to be fed, means for forcing said strip into contact with the strip feeding means to feed the same, a visual measuring device for measuring the length of strip fed out, comprising a stationary scale and a pointer, means to move the pointer along the scale in synchrony with the strip feeding means when the same is in contact with the strip so that the pointer measures the length of tape fed out.

27. A strip serving machine of the type described comprising a supply of gummed strip, a strip moistening means, a strip severing means and a continuously movable strip feeding means normally inoperative to move the strip, means to cause said feeding means to engage the strip to feed the same from the machine, visual means for measuring the length of strip fed from the machine, said measuring means comprising a stationary scale, a pointer movable along the scale in synchrony with the strip feeding means when the same is in contact with the strip, and means for returning the pointer to its normal position upon the releasing of the strip feeding means from the strip.

28. In a strip serving device a releasable strip feeding means, a strip moistening means, strip severing means, a visual measuring device for measuring the length of strip fed out consisting of a stationary measuring scale along which an indicating means indicative of the length of strip fed out is adapted to move, means to move said strip feeding means continuously and means to cause said strip feeding means to engage the strip to feed the same and to cause the indicator to move along the scale.

TREVOR R. GAUTIER.
HAROLD E. NICHOLS.